Nov. 3, 1953

R. C. WILCOX 2,658,176

NEUTRALIZATION OF RADIO-FREQUENCY POWER SUPPLIES

Filed Oct. 25, 1950

Inventor
Roy C. Wilcox
BY
Attorney

Patented Nov. 3, 1953

2,658,176

UNITED STATES PATENT OFFICE 2,658,176

NEUTRALIZATION OF RADIO-FREQUENCY POWER SUPPLIES

Roy C. Wilcox, Collingswood, N. J., assignor to Radio Corporation of America, a corporation of Delaware Application October 25, 1950, Serial No. 192,078

5 Claims. (Cl. 321—10)

1

This invention relates to improvements in unidirectional voltage power supply systems, and while not limited thereto finds particular application in systems of the type which include a radio frequency oscillator in a voltage step-up arrangement. For brevity, such systems are referred to as "R. F. power supplies."

In R. F. power supply systems, a relatively low unidirectional voltage is converted to relatively high oscillatory voltage by means of an oscillator and suitable transformer. This oscillatory voltage then is rectified to provide a high unidirectional output voltage (see e. g. United States Patent 2,374,781—Schade). Such power supplies are frequently used in television apparatus, radiation detectors, electron microscopes and the like.

In view of the relatively high frequency voltages involved in R. F. power supply systems, special problems arise that are not ordinarily encountered in more conventional power supply systems where only low frequency alternating voltages are involved. For example, in R. F. power supplies, multielement filter networks for removing ripple components from the unidirectional output voltage often are inconvenient to use since they may act as radiators of high frequency voltages, and, therefore, may introduce a shielding problem. On the other hand, the fact that high frequency voltages are involved makes it possible to substantially reduce or eliminate ripple components from the system output voltage without the use of a complex filter.

It is a general object of the present invention to provide an improved R. F. power supply system.

A more specific object of the invention is the provision of an R. F. power supply system wherein ripple components of the system output voltage are materially reduced or substantially eliminated without complex filtering networks.

In accordance with the invention, the foregoing and other related objects and advantages are attained by arranging the output circuit of an R. F. power suply system as part of a four-arm "capacity bridge." The arrangement is such that, when the bridge is properly balanced, no alternating voltage will appear between two of the terminals thereof, although unidirectional voltage is developed between those two terminals. Therefore, a load connected to the terminals will receive unidirectional voltage without ripple.

Figure 1:
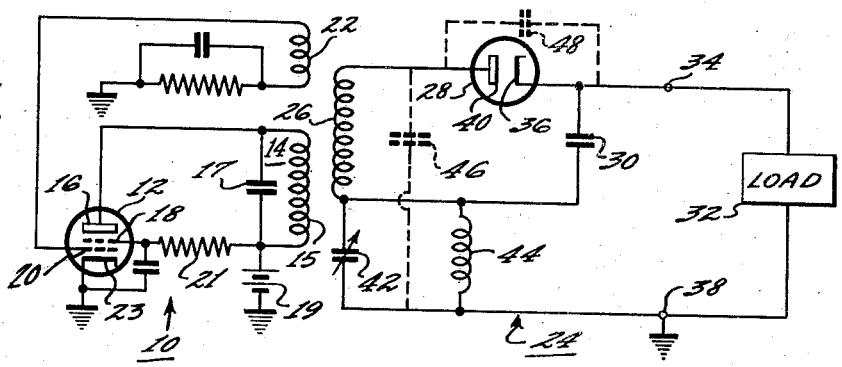
Figure 2:
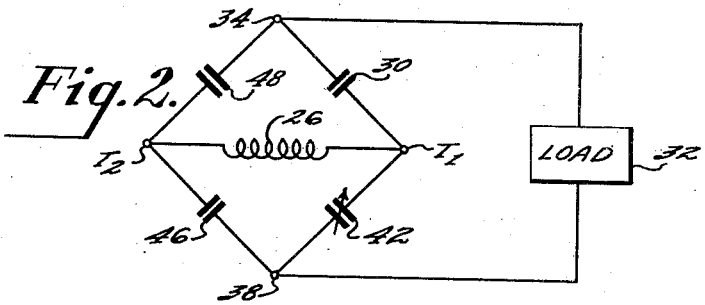
Figure 3:
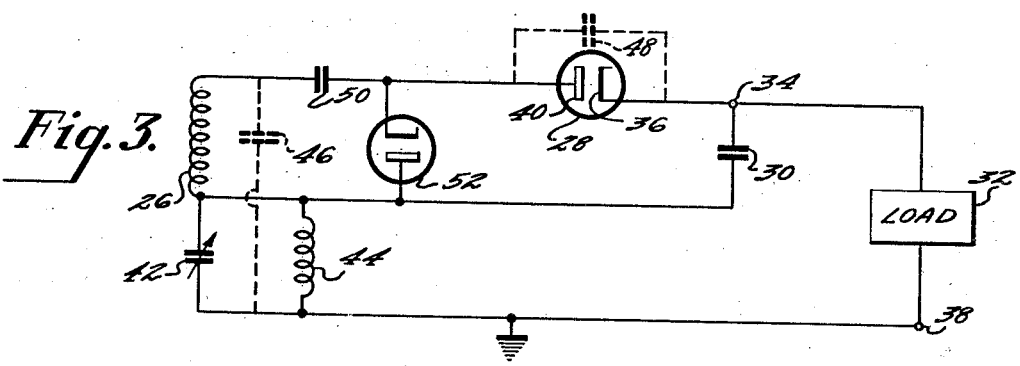
Figure 4:
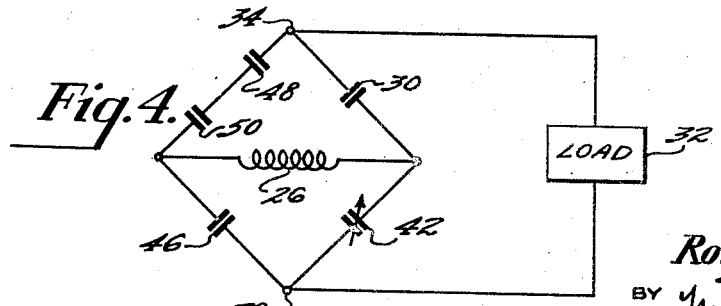

A more complete understanding of the invention can be had by reference to the following description of illustrative embodiments thereof, when considered in connection with the accompanying drawing, wherein:

Figure 1 is a schematic diagram of an R. F. power suply system arranged in accordance with the invention, Figure 2 is a schematic diagram of a bridge circuit corresponding to part of the system of Fig. 1, Figure 3 is a schematic diagram of a voltage doubler output circuit embodying the principles of the invention, and Figure 4 is a schematic diagram of a bridge circuit corresponding to part of the circuit of Fig. 3.

Referring to Fig. 1 of the drawing, an R. F. power supply system arranged in accordance with the invention comprises an oscillator circuit 10 including a tetrode tube 12 having a resonant tank circuit 14 connected to the anode 16 thereof. The tank circuit 14 comprises a coil 15 in parallel with a capacitor 17. The anode 16 and the screen grid 18 of the tube 12 are connected to receive relatively low unidirectional voltage from a source shown as a battery 19. A voltage dropping resistor 21 is connected between the screen 18 and the battery 19.

To sustain oscillation in the circuit 10, the tube control grid 20 is inductively coupled to the anode tank circuit 14 through a feedback coil 22. The tube cathode 23 is connected to the negative side of the battery 19 through "ground."

Since the portion of the circuit of Fig. 1 thus far described is quite conventional, it is believed that a detailed description of the operation thereof is unnecessary. When unidirectional operating voltage is applied to the tube 12 from the battery 19, oscillatory voltage will be developed across the tank circuit 14 at a frequency determined by the various circuit parameters.

The output section 24 of the power supply system of Fig. 1 includes a coil 26 which is inductively coupled to the oscillator tank circuit 14. A rectifier 28 and a capacitor 30 are connected in series across the coil 26. A load device 32, such as a television kinescope or the like, is connected between a first output terminal 34 (at the cathode 36 of the rectifier 28) and a second output terminal 38 which is shown connected to ground. A capacitor 42 is connected between the coil 26 and the second output terminal 38. A coil 44 in parallel with the capacitor 42 provides a direct current return path from the load 32 to the coil 26.

In the usual case, the coil 26 will have a relatively large number of turns as compared with the coil 15 so that the oscillatory voltage developed across the tank circuit 14 will be multiplied as it appears across the coil 26 by the square root of the ratio of the impedance of the coil 26 to the impedance of the coil 15. That is, the coil 15 acts as the primary winding of a step-up transformer having a secondary winding 26. The oscillatory voltage across the winding 26 will be rectified by the tube 28 to provide a high unidirectional voltage to the load 32.

In a usual rectifier system, the rectifier output voltage includes a pulsating or "ripple" component superimposed on the unidirectional component. This ripple component is substantially eliminated in the circuit of Fig. 1 by proper choice of values of the capacitors 30, 42, as will now be explained.

In Fig. 1, a capacitor 46 is shown in dotted lines from the junction of the winding 26 with the anode 40 and ground. This capacitor 46 is a "lumped" representation of distributed capacity between "ground" (usually the chassis of the equipment) and the winding 26, and is not an actual circuit element. At the frequencies used in R. F. power supplies, this distributed capacity ordinarily will provide sufficient reactance for a purpose explained hereinafter. If not, the capacity 46 may be augmented by an ordinary capacitor connected from the tube anode 40 to ground. Similarly, a capacitor 48 is shown in dotted lines in shunt with the rectifier 28. This capacitor 48 represents the capacity between the elements 36, 40 of the tube 28 and not an actual circuit element, although it can be augmented by an ordinary capacitor if necessary. These capacitors 46, 48, together with the capacitors 30 and 42, comprise the elements of a capacity bridge circuit to eliminate ripple in the system output voltage.

To clarify this relationship, the bridge circuit is shown in simplified form in Fig. 2. In the bridge circuit of Fig. 2, the capacitor 48 and the capacitor 30 form one conjugate pair of arms in parallel with the winding 26, which provides the input coupling to the bridge, while the capacitor 46 and the capacitor 42 form a second conjugate pair of arms in parallel with the winding 26. The load 32 is connected between the output terminals 34, 38.

As is well known, a bridge of the type shown in Fig. 2 is said to be "balanced" if the ratio between the reactances of the elements in one conjugate pair of arms, say the elements 46, 42, is equal to the ratio between the reactances of the elements forming the other conjugate pair 48, 30. Assuming the bridge to be balanced in this manner, no alternating voltage will appear across the load 32 when voltage is induced in the winding 26. From the standpoint of the circuit of Fig. 1, this simply means that although alternating voltage can appear across the rectifier tube 28 to be converted to unidirectional voltage, there will be no alternating voltage between the terminals 34, 38, and hence no ripple in the load voltage. Stated somewhat differently, it can be said that the instantaneous voltage at opposite ends of the winding 26 can fluctuate, but that the instantaneous voltage at the output terminals 34, 38 will not change. This, of course, does not mean that a unidirectional voltage cannot be developed between the output terminals 34, 38, but only that no alternating potential will appear between these terminals. In this way, the ripple component can be eliminated to an extent limited only by the slight unbalance contributed by the forward resistance of the diode and the accuracy with which one balances the bridge. In the usual case, it is deemed preferable to make the capacitor 42 variable to allow compensation for slight changes in the values of the bridge elements.

It will be understood that the coil 44 simply provides a direct current return path of relatively high alternating current impedance. A resistor can be substituted if the additional impedance to direct current is not objectionable.

In Fig. 3 of the drawing, there is shown an embodiment of the invention as applied to a voltage doubler output circuit for an R. F. power supply. For simplicity, only the output section of the system is shown. It will be understood that the winding 26 ordinarily will be the secondary winding of a transformer, as in the circuit of Fig. 1.

In the circuit of Fig. 3, a first capacitor 50 and a first rectifier 52 are connected in series across the winding 26. The capacitor 50 also is in series with a second rectifier 28 and a second capacitor 30 across the winding 26. The rectifiers 52, 28 are connected in these two series circuits in opposite polarity with respect to the winding 26. A load 32 is connected between a first output terminal 34 (at the cathode 36 of the second rectifier 28) and a second (grounded) output terminal 38. The direct current return path from the terminal 38 is through a coil 44. A variable capacitor 42 in shunt with the coil 44 serves as an adjustable element in a capacity bridge, as explained hereinafter.

The operation of the voltage doubler circuit of Fig. 3 is such that when the voltage across the winding 26 is of correct polarity to cause current flow through the first rectifier 52, a voltage substantially equal to that across the coil 26 will be developed across the first capacitor 50. When the polarity of the coil voltage reverses, the second rectifier 28 will conduct. The voltage across the second rectifier 28 will be the sum of the voltage across the coil 26 and the voltage across the first capacitor 50. Therefore, when the second rectifier 28 conducts, there will be developed across the second capacitor 30 a voltage substantially equal to twice the voltage across the coil 26. This voltage across the second capacitor 30 then will be available for energizing the load 32.

As shown in dotted lines, there will be distributed capacity 46 in the circuit of Fig. 3 between the winding 26 and ground, as well as capacity 48 between the elements 36, 40 of the tube 28. As in the circuit of Fig. 1, it will be understood that the capacitors 46, 48 represented by the dotted lines ordinarily will not be actual elements in the circuit of Fig. 3. At the frequencies at which R. F. power supply systems operate, the capacitors 30, 42, 46, 48 will form a bridge circuit for eliminating ripple components of the output voltage. This bridge circuit is shown in simplified form in Fig. 4.

As shown in Fig. 4, the ripple-eliminating bridge for the circuit of Fig. 3 is very similar to the bridge shown in Fig. 2 for the circuit of Fig. 1, with the exception that an additional capacitor 50 appears in the circuit of Fig. 4. As was previously explained, this capacitor 50 acts as a voltage storing device in the voltage doubling network. However, the presence of this capacitor 50 in the bridge circuit does not alter the operation or the beneficial characteristics thereof.

While the invention has been described with particular reference to R. F. power supply systems and is believed to be best adapted for use in connection therewith, it is to be understood that the invention is by no means limited thereto. In conventional low frequency systems, operating at commercial power frequencies, the distributed capacity in the circuit ordinarily will not be sufficient to form a beneficial bridge arrangement. In this case, it is necessary to use additional capacitors as circuit elements to supplement the capacity inherently present in the circuit.

Since many changes could be made in the specific circuit shown and described, all within the scope and spirit of the invention, the foregoing is to be construed as illustrative, and not in a limiting sense.

What is claimed is:

1. In a rectifier circuit for a power supply system of the type wherein a rectifier having interelectrode capacitance is connected to convert alternating voltage appearing across a transformer winding into unidirectional voltage, the combination with said rectifier and said winding of a pair of capacitors having a common terminal connected to one end of said winding, and means effectively providing distributed capacity between the other end of said winding and the other terminal of one of said capacitors, the other terminal of the other of said capacitors being connected to said rectifier, said capacitors, said interelectrode capacitance of said rectifier, and said means being connected in said circuit and being a four-arm capacity bridge having two conjugate pairs of arms in shunt with said winding, one of said conjugate pairs comprising said one capacitor and said means, and the other of said conjugate pairs comprising the other of said capacitors and the interelectrode capacitance of said rectifier.

2. In an R. F. power supply system of the type including an oscillator circuit having an output transformer with primary and secondary windings and a rectifier connected to said secondary winding to convert oscillatory voltage across said secondary winding to unidirectional voltage, in combination, a pair of output terminals adapted to be connected to a load device, one of said terminals being connected to said rectifier, a capacitor connecting said one terminal to one end of said secondary winding, a second capacitor connecting said one end of said winding to the other of said output terminals, and a coil connected in parallel with said last named capacitor.

3. In a voltage doubler network for converting alternating voltage developed across a transformer winding to unidirectional voltage, in combination; a first circuit in parallel with said winding, said first circuit comprising a serially connected capacitor and rectifier element, a second circuit in parallel with said winding, said second circuit comprising the series combination of said first capacitor and a second rectifier and second capacitor, said rectifiers being connected in said circuits in opposite polarity with respect to said winding, a pair of output terminals, one of said output terminals being connected to the junction of said second rectifier and said second capacitor, a third capacitor connected between the other of said output terminals and the junction of said second capacitor and said winding, and a coil in parallel with said third capacitor.

4. In a power supply output circuit, in combination, a transformer winding, a rectifier and a capacitor connected in series across said winding, said rectifier having anode and cathode elements with capacity therebetween, said capacitor and said capacity forming a first pair of conjugate arms of a capacity bridge, a first output terminal connected to the junction of said rectifier and said capacitor, a second output terminal, distributed capacitoy between said winding and said second terminal, and a second capacitor connecting said second terminal to said winding, said second capacitor and said distributed capacity forming a second pair of conjugate arms of said capacity bridge, said bridge being balanced by selection of the relative values of the elements thereof so that substantially no alternating voltage will appear between said output terminals.

5. In an R. F. power supply output circuit, in combination, a transformer winding, a rectifier having anode and cathode elements with interelectrode capacity therebetween, one of said elements being coupled to one end of said transformer winding, a first output terminal connected to the other of said rectifier elements, a second output terminal, an inductance element connected between said second output terminal and the other end of said transformer winding, said transformer winding and inductance element having a distributed capacitance thereacross, a first capacitor connected between said first output terminal and said other end of said output winding, and a second capacitor connected between said second output terminal and said other end of said transformer winding, said first and second capacitors being connected to form a bridge circuit with said interelectrode capacity and said distributed capacitance.

ROY C. WILCOX.

References Cited in the file of this patent

UNITED STATES PATENTS

| Number | Name | Date |
| --- | --- | --- |
| 1,738,760 | Crouse | Dec. 10, 1929 |
| 1,804,850 | Crouse | May 12, 1931 |
| 1,920,948 | Crouse | Aug. 1, 1933 |
| 2,539,100 | Rado | Jan. 23, 1951 |

FOREIGN PATENTS

| Number | Country | Date |
| --- | --- | --- |
| 270,797 | Great Britain | May 11, 1927 |